No. 766,569. PATENTED AUG. 2, 1904.
L. F. ADT.
EYEGLASSES.
APPLICATION FILED APR. 11, 1903.
NO MODEL.
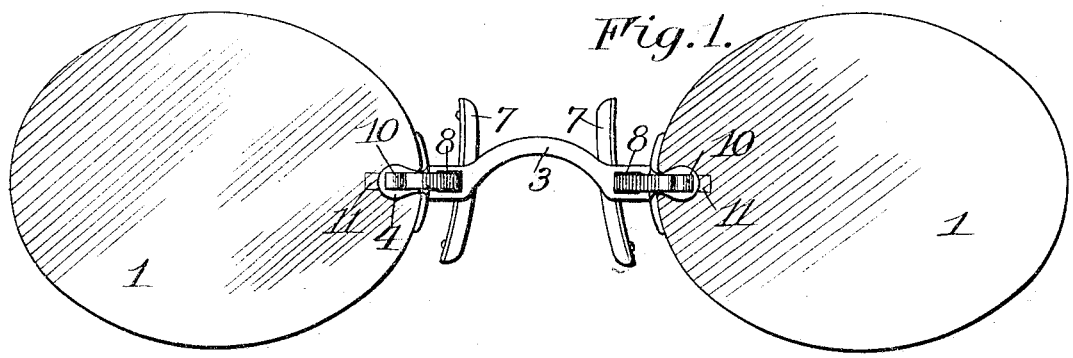
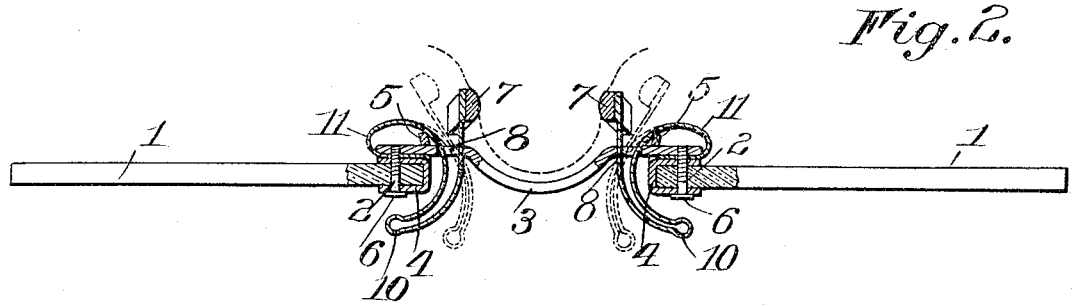
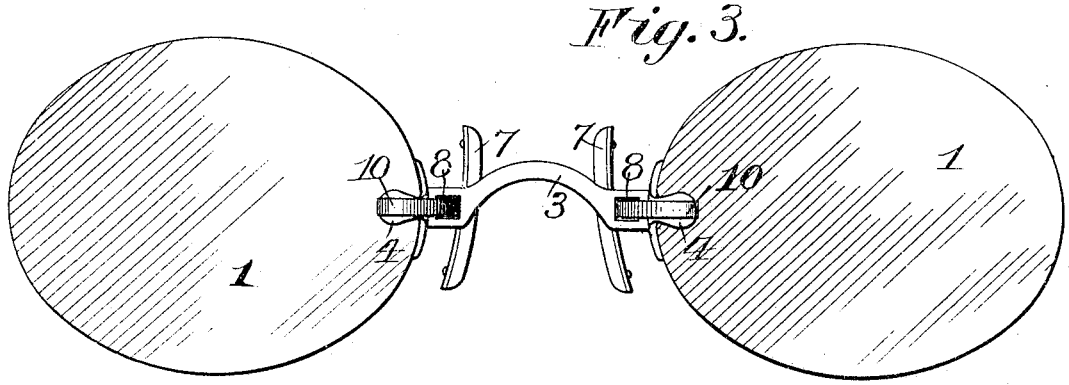
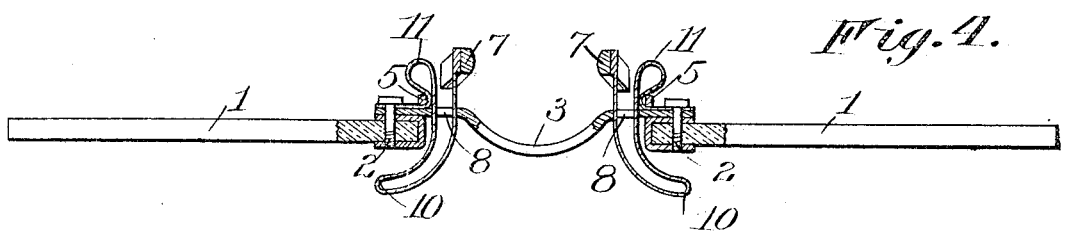
Witnesses.
Walter B. Payne
Russell B. Griffith
Inventor.
Leo F. Adt
By Frederick F. Church
his Attorney No. 766,569. Patented August 2, 1904.

UNITED STATES PATENT OFFICE.

LEO F. ADT, OF TROY, NEW YORK.

EYEGLASSES.

SPECIFICATION forming part of Letters Patent No. 766,569, dated August 2, 1904.

Application filed April 11, 1903. Serial No. 152,200. (No model.)

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to eyeglasses, and particularly to that class in which the lenses are secured to a relatively inelastic bridge and in which the guards or holding-pads are yieldingly secured to the lenses or frame and are provided with operating portions by which said pads may be manipulated and the glasses readily applied to and removed from the nose of the wearer.

The invention consists in certain improvements and combinations whereby the parts may be readily constructed and assembled and the glasses secured and removed in the best manner, all as will be more fully described, and the novel features pointed out in the claims at the end of the specification.

In the drawings, Figure 1 is a front elevation of a pair of glasses embodying my improvements. Fig. 2 is a horizontal sectional view of the same, taken through the attaching-clips and the guard-supports. Fig. 3 is a front elevation of another form of the invention. Fig. 4 is a horizontal sectional view of the same similar to Fig. 2.

Similar reference-numerals in the several figures indicate similar parts.

The lenses (indicated by 1) are provided at their inner edges with the usual perforations, through which pass the securing-screws 2, serving to connect the parts with the bridge 3. In the present instance the clips 4 on the inner edges of the lenses are provided with perforated lugs extending on opposite sides of the lenses and in addition with lugs 5, extending rearwardly at the inner edge of the clips and provided with apertures for the passage of the ends of the bridge 3. The ends of the bridge and the clips and lugs are perforated for the passage of securing-screws 2, having at one end the heads 6 and threaded at the other end to engage corresponding threads in one of the parts. Thus in Figs. 1 and 2 the heads of the screws are arranged at the front of the glasses, and the opposite ends engage threaded apertures in the bridge 3, while in Fig. 4 the screws pass through in the opposite direction, the threaded end engaging the outer lugs of the clips.

7 7 indicate the pads, guards, or portions adapted to bear upon the nose of the wearer and formed upon or connected to the ends of the supports. These supports or arms are each composed of a single strip of flat spring metal, one end of which is attached to the lenses and bridge and extend rearwardly, being formed into loops 11, thence forwardly of the lenses, passing through apertures 8 in the bridge, thence outwardly in front of the lenses, where they are bent sharply, forming loops 10, and returned to the rear of the lenses through the apertures in the bridge, their extreme ends having the pads or guards attached thereto in any suitable manner. It is immaterial in exactly what manner the ends of the springs are attached to the clips, and in Fig. 2 I have shown the end of the guard-support located between the bridge end and the clip and extending rearwardly of the clip; but I prefer the construction shown in Fig. 4, in which the spring is bent sharply, then passed inwardly through the aperture in the lug 5 of the clip, and thence rearwardly to form the loop 11, and through the bridge-aperture, the head of the securing-screw in this instance engaging said spring.

From the above construction it will be seen that the guards 7 are mounted upon the extreme ends of the relatively long springs provided with two loops 10 and 11, serving to yieldingly engage the wearer's nose, but with sufficient pressure to hold the glasses firmly in position, and the outer forwardly-projecting loops 10 serve as handles by means of which the operator may separate the guards or pads, as shown in dotted lines in Fig. 2, and thereby readily apply or remove the glasses from the nose. When the glasses are held upon the nose of the wearer, the principal spring-pressure is exerted between the pads or guards and the loops 10, and when the guards are separated by pressing together the outer ends of the loops 10 the arms are then turned also on a center approximating that of the loops 11, so that an extreme separation of the guards will be obtained without unduly straining the parts. In order to obtain an increased movement of the guards when separated with a slighter movement of the ends of the loops 10 than would otherwise be the case, I form the apertures 8 in the bridge of such a length that when the arms or supports are moved about the loops 11, as centers their outer or free ends will engage and be fulcrumed on the inner wall or edge of the apertures. The loops 11 or the pivotal points of the arms lying in rear of the fulcrums causes the guards 7 7 to move rearwardly as well as laterally, so that their relative movement when engaging the wearer's nose moves the glasses toward the wearer's face.

The guard-arms described may be constructed of flat spring material, and by reason of the forward and rearward loops the pads or guards are capable of a wide variation of adjustment without changing the length of the bridge, so that glasses provided with my invention may be readily adapted to persons having different facial characteristics by the optician.

The term "loops" employed in the specification is intended to mean the part formed by bending the material back upon itself, and though I prefer that the portions called "loops 11" shall be of a rounded contour, as they afford an easy movement of the parts, I do not desire to be confined to this construction.

I claim as my invention—

1. The combination with the lenses and the bridge connecting them, of a pair of spring guard-arms secured at their ends to the bridge and lenses in rear of the latter thence extending rearwardly and forwardly again and passing between the lenses, thence forwardly and outwardly thence rearwardly between the lenses and provided at their free ends with opposing guards or nose-engaging portions.

2. The combination with the lenses and the bridge connecting them, of a pair of spring guard-arms each connected at one end to the lenses and bridge and formed into return-bends in rear and in front respectively of the plane of the lenses and having nose-bearing portions at their free ends in rear of the lenses, the bends at the front serving as operating portions to separate the nose-bearing portions when pressed together.

3. The combination with the lenses, of the bridge having the apertures therein and the nose-guard arms secured at the ends, said arms extending forwardly and rearwardly through the apertures in the bridge and provided at their free ends in rear of the lenses with the nose-bearing portions.

4. The combination with the lenses, the clips having the lugs with apertures and the bridge passing through said apertures, of the spring guard-arms clamped to the clips and bridge at their ends, thence extending forward of the lenses and thence in rear thereof and provided with the nose-bearing portions thereon.

5. The combination with the lenses and the bridge connecting them, of the arms each constructed of a single piece of flat spring material extending rearwardly from the lenses, thence forwardly between them and beyond their outer faces thence rearwardly of the lenses and provided on their free ends with opposing nose pads or guards.

6. The combination with the lenses, of a bridge connecting them having fulcrums, and arms fixed to the mounting and extending at the forward and rear side of the planes of the lenses and movable relatively thereto and engaging the fulcrums whereby the ends of the arms at one side of the lenses may be moved toward each other to separate their opposite ends.

7. The combination with the lenses, a bridge connecting them having fulcrums and arms extending at the forward and rear sides of the planes of the lenses and engaging the fulcrums, of means located at one side of the fulcrums for movably supporting the arms, and guards on the arms.

8. The combination with the lenses, a bridge connecting them having fulcrums, of arms engaging the latter having their rear ends extending at one side of the plane of the lenses and provided with guards and the forward ends extending at the other side of the plane of the lenses and having portions by which they are secured to the lenses.

9. The combination with the lenses and a bridge connecting them having fulcrums, of resilient arms rigidly secured to the lenses at one side of the plane thereof and extending to the opposite side of said plane beyond the fulcrums and the free ends on said arms engaging the fulcrums and provided with guards.

LEO F. ADT.

Witnesses:
CHARLES S. ALDRICH,
MICHAEL F. O'CONNOR.